DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 711

T869,003

POLYKETONE FROM DIBENZO-PARA-DIOXIN AND ISO- OR TEREPHTHALOYL HALIDE

Roland Darms, Fairfax, Del., assignor to E. I. du Pont de Nemours and Company, Wilmington, Del., a corporation of Delaware

Filed Feb. 5, 1968, Ser. No. 702,827
Int. Cl. C08g *33/00, 23/00*
U.S. Cl. 260—47
No Drawing. 12 Pages Specification

Polyketones and copolyketones are provided which are characterized by the recurring structural formula:

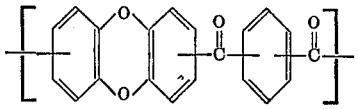

where the phenylene radical is either para-phenylene, meta-phenylene or mixtures thereof, and the polymer contains a sufficient number of the units to provide a polymer having an inherent viscosity of at least 0.3, measured on a 0.5 percent by weight solution in concentrated sulfuric acid or other solvent at 30° C. The above polyketones and copolyketones are useful as high temperature electrical insulation.